March 8, 1932.  J. V. ROOK  1,848,201
BRAKE LEVER CONTROL FOR GASOLINE SUPPLY
Filed April 8, 1931
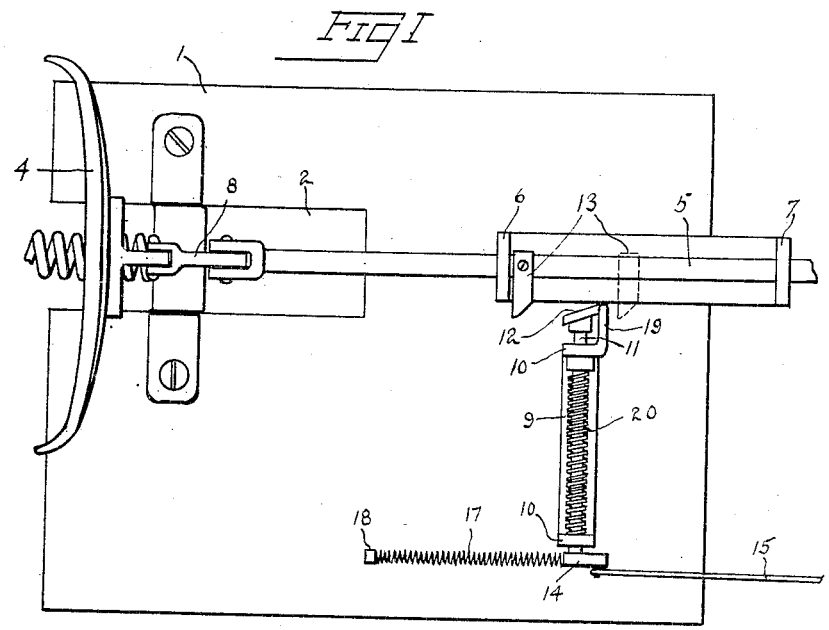
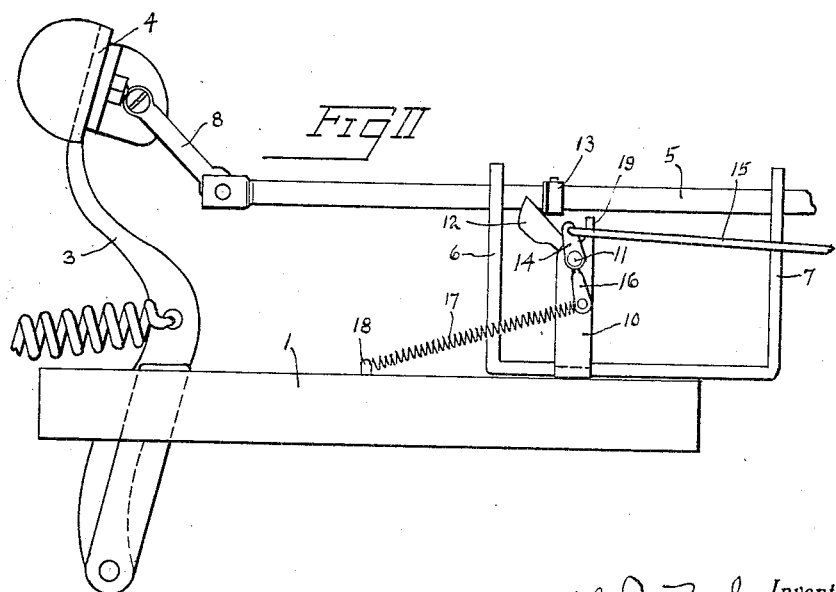
Joseph V. Rook, Inventor
By Walter N. Haskell,
his Attorney Patented Mar. 8, 1932

1,848,201

UNITED STATES PATENT OFFICE

JOSEPH V. ROOK, OF MOLINE, ILLINOIS

BRAKE LEVER CONTROL FOR GASOLINE SUPPLY

Application filed April 8, 1931. Serial No. 528,579.

My invention has reference to a brake lever control for the gasoline supply to the engine of a motor vehicle, and aims to increase the efficiency and utility of such devices. The chief purpose thereof is to have the feed mechanism for the gasoline under the control of the service brake apparatus, so that one action of the foot will serve to reduce the speed of the vehicle and apply the brake, or release the brake and increase the speed. The necessity of shifting the foot from the accelerator to the brake or the reverse is thereby done away with. The invention can be used as an independent mechanism, or in connection with an accelerator apparatus such as is now in common use in motor vehicles.

There are many times in the operation of an automobile when a quick shut-off of the fuel supply and application of the brake is called for. One of these is in congested traffic, with cars travelling in close proximity to each other. Another is when a car is being speeded up and a pedestrian or other obstacle looms up just ahead of the vehicle. Still another is when backing a car out from a curb into the line of traffic. The minimum time required for making the change of the foot from the accelerator to the brake pedal is about one second, but in that second or more of time it is possible for the car to travel a sufficient distance to cause a collision or other accident. Another instance of difficulty in handling the car as at present equipped is when running it into a garage with a slight incline at the entrance, requiring a speeding of the engine to bring the rear wheels up the incline, and then a quick shifting of the foot to the brake control. All of these dangers are minimized by the use of the present invention.

Another advantage in the use of the invention is derived from the possibility of quick starting after having come to a stop with the brake set, as at a street intersection, as the same movement which releases the brake turns on the fuel supply. This is also a help when the vehicle has been stopped when going up a steep incline.

The invention is of simple construction, and can be applied to the brake mechanism of cars of usual build with little addition to the cost of production thereof.

The particular construction, arrangement, and operation of the invention is hereinafter pointed out in one of its embodiments, taken in connection with the accompanying drawings, in which:—

Fig. 1 shows the invention in plan view, when applied to the brake mechanism of a motor vehicle.

Fig. 2 shows the same in side elevation.

The reference number 1 indicates a board or plate comprising a part of the frame of a motor vehicle, said board being provided with an opening at 2, in which are installed the mountings for a brake lever 3, fitted with a pedal 4. A slide bar 5 is mounted in a pair of supports 6 and 7, the rear end of said bar being connected with the pedal 4 by a link 8, and the other end with the brake mechanism in the usual manner, and not shown in the drawings herein. At one side of the bar 5 is a frame 9, provided at its ends with supports 10, in which is rockingly mounted a rod 11, to one end of which is fixed a cam 12, in line of movement of a lug 13 secured to the slide-bar 5. On the other end of the rod 11 is fixed an arm 14, connected by a rod 15 with the throttle valve controlling the gasoline supply of a motor, or with other controlling devices thereof, which are not shown herein. An arm 16 is also fixed to the rod 11, and connected by a coiled spring 17 with a fixture 18 on the board 1. Said spring assists in returning the rod 11 to its normal position after having been opened to increase the flow of fuel, and said spring may be omitted when the valve mechanism is provided with tension devices of sufficient strength to perform such work.

The rocking movement of the rod 11 in a direction to close the throttle valve is arrested by a stop 19, with which the edge of the cam 12 comes in contact, as shown in Fig. 1. The rod 11 is also capable of a limited movement longitudinally, away from the slide-bar 5, permitting a movement of the cam 12 out of the path of the lug 13, a return movement of said cam and rod being enforced by means of a coiled spring 20 on said rod 11.

Upon the brake-rod being forced forwardly in the operation of setting the brakes the bevelled end of the lug 13 engages a similarly sloping face of the cam 12, forcing the cam out of the way, without any effect upon the rod 11 other than that of moving it end-ways. When the rod is in its normal position with the cam 12 elevated, the engine is operating at idling speed, and in the movement of the slide-bar 5 in setting the brakes the lug 13 passes the cam 12 and reaches a position about as shown in broken lines in Fig. 1 before the brakes begin to act. In again releasing the brakes this same position is attained before the brakes are fully released, and a continued movement of the bar 5 rearwardly causes the lug 13 to engage the cam 12, rocking said cam and the rod 11, as shown in Fig. 2. This results in the opening of the throttle valve, and increase in the speed of the engine, such speed being increased or diminished in accordance with a greater or less rocking movement of the rod 11. The contact of the cam 12 and lug 13 is such that the engine can be given a maximum amount of speed before such parts will disengage. It will be noted that while the vehicle is being operated in this manner if it is desired to stop it suddenly this can be accomplished by merely pushing the slide-rod 5 forward again, practically cutting off the fuel supply to the engine and setting the brakes, and without any interval of time such as occurs when it is necessary to shift the foot from one pedal to the other. The confusion which sometimes occurs in making such shift, and operation of the wrong pedal, is also eliminated.

If it is desired to use the invention in connection with the usual accelerator mechanism this can be done by shifting to the accelerator pedal after a considerable amount of speed has been attained by the mechanism herein described.

In the event of the accidental release of the foot from the brake pedal while the parts 12 and 13 are in engagement such parts will immediately dis-engage, and the speed of the engine reduced to a minimum.

What I claim, and desire to secure by Letters Patent, is:—

1. In combination with the brake mechanism of a motor vehicle, including a slide-bar, movable in the brake setting and releasing operations, a member in proximity to said slide-bar, operably connected with the gasoline feed control of the motor of said vehicle, and movable to open or close the same, a cam fixed on said member, and an object on said slide-bar engageable with said cam on a movement of the slide-bar to release the brakes, and non-engageable therewith upon the brake-setting movement.

2. In combination with the brake mechanism of a motor vehicle, including a slide-bar provided with cam engaging means, and movable to set the brake or release the same, a rod rockingly mounted in proximity to said slide-bar and having a limited movement to or from the same, connections between said rod and the gasoline feed of said motor vehicle, a cam on said rod non-engageable by said cam engaging means upon a movement of said slide-bar for setting the brakes, and engageable thereby on a return movement, means for returning said rod to a normal position after being rocked, and means for returning said rod to its original position after having been moved away from said slide-bar.

3. In combination with the brake mechanism of a motor vehicle including a slide-bar provided with cam engaging means, movable for setting the brakes of the vehicle or releasing the same, a gasoline feed control mechanism, including a member in proximity to said slide-bar, and movable to open or close the gasoline feed devices, and a cam on said member engageable by said cam engaging means, the initial movement of the slide-bar carrying the cam engaging means to a position for immediate engagement with said cam following the release of the brakes.

In testimony whereof I affix my signature.

JOSEPH V. ROOK.